US007356809B1

(12) United States Patent
Sturges

(10) Patent No.: US 7,356,809 B1

(45) **Date of Patent: *Apr. 8, 2008**

(54) PROGRAMMABLE INTERPRETIVE VIRTUAL MACHINE

(75) Inventor: Jay J. Sturges, Orangevale, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/512,395

(22) Filed: Feb. 24, 2000

Related U.S. Application Data

(63) Continuation of application No. 08/287,064, filed on Aug. 8, 1994, now Pat. No. 6,138,273, which is a continuation of application No. 07/633,594, filed on Mar. 1, 1991, now abandoned.

(51) Int. Cl.
*G06F 9/45* (2006.01)

(52) U.S. Cl. ...................................... 717/139; 717/127

(58) Field of Classification Search ........ 717/136–148, 717/149–150, 126–127, 131, 162–167, 106–107

See application file for complete search history.

(56) References Cited

U.S. PATENT DOCUMENTS

| | | | | | |
|---|---|---|---|---|---|
| 3,938,103 | A | * | 2/1976 | Welin | 395/375 |
| 4,173,041 | A | * | 10/1979 | Dvorak et al. | 712/226 |
| 4,309,756 | A | * | 1/1982 | Beckler | 395/700 |
| 4,517,640 | A | * | 5/1985 | Hattori et al. | 395/425 |
| 4,631,663 | A | * | 12/1986 | Chilinski et al. | 395/375 |
| 4,719,564 | A | * | 1/1988 | Hara | 717/139 |
| 4,980,821 | A | * | 12/1990 | Koopman et al. | 395/800 |
| 5,070,451 | A | * | 12/1991 | Moore et al. | 395/375 |
| 5,504,901 | A | * | 4/1996 | Peterson | 717/144 |
| 5,721,924 | A | * | 2/1998 | Kitadate | 717/131 |
| 5,828,883 | A | * | 10/1998 | Hall | 717/133 |
| 6,138,273 | A | * | 10/2000 | Sturges | 717/114 |

OTHER PUBLICATIONS

David Gries, "Compiler Construction for Digital Computers," 1971 by John Wiley & Sons, Inc., pp. 245-272.*

Peter Calingaert, "Assemblers, Compilers, and Program Translation," 1979, Computer Science, Press, Inc , pp. 99-107 ; 126-150.*

Ellis Horowitz et al., "Data Structures in Pascal," 1987, Computer Science Press, Inc pp. 65-93.*

Aho et al. Compiler, Principles, Techniques, and Tools. p. 65. p. 160. 1988.*

Richard Gabriel, "Performance and Evaluation of Lisp Systems", MIT Press, Series: ISBN 0-262-07093-6, pp. i-vii, 1-285, Aug. 1985.*

* cited by examiner

*Primary Examiner*—Ted T. Vo

(74) *Attorney, Agent, or Firm*—Michael R. Barre

(57) ABSTRACT

A method involves operations for executing source code instructions expressed in a programming language. The operations comprise receiving a series of source code instructions expressed in a programming language, wherein at least one of the source code instructions includes a command and one or more arguments. In response to receiving the source code instruction, at least part of a stack-based execution stream is built. The stack-based execution stream is also executed. The operation of building at least part of a stack-based execution stream involves storing the instruction's argument on a stack, determining an address for an object code routine corresponding to the instruction's command, and storing the address for said object code routine on the stack. Other embodiments are described and claimed.

19 Claims, 10 Drawing Sheets

PROGRAMMABLE INTERPRETIVE VIRTUAL MACHINE

CROSS-REFERENCE TO RELATED APPLICATIONS

This application is a Continuation of U.S. patent application Ser. No. 08/287,064, entitled Programmable Interpretive Virtual Machine, naming inventor Jay J. Sturges, filed on Aug. 8, 1994, and issued on Oct. 24, 2000 as U.S. Pat. No. 6,138,273, which was a Continuation of U.S. patent application Ser. No. 07/663,594, filed on Mar. 1, 1991 now abandoned.

FIELD OF THE INVENTION

The field of the invention relates to the field of computer programming languages. Specifically, the invention relates to interpreting and executing a computer programming language.

BACKGROUND OF THE INVENTION

The current common method for interpreting a computer programming language and processing of same, is to transpose the highest level form into a more generic form of pseudo language. Typically, the programming language is transposed into an assembly language. This pseudo language is then interpreted and processed via branch to appropriate functions and procedures.

This process of transposing a programming language into a pseudo language before execution is a time consuming step. Typically the time required to transpose high level code into pseudo code can be equal to if not longer in time than processing the pseudo instruction set.

Additionally, transposing and executing the originally specified logic in pseudo code form typically creates a performance loss in the operation of the logic. With transformation into a new form, there is a loss of expression which must be realized in the new form. This loss is reflected in repetitions of instructions. For example, a conditional statement of a computer programming language may be realized in the following form:

```
while (j<10) do
  begin
    j:=j+1
  end
```

In the typical prior art method of interpreting a programming language, the above example would typically be transposed into a test condition statement with label, an arithmetic expression, an assignment statement and jump to the test condition statement label. Given that the arithmetic expression would be equivalent to one instruction, this prior art transposition would produce at least five pseudo code instructions. These five pseudo code instructions would then be executed sequentially in at least five processor clock cycles. Thus, relatively simple expressions in a high level language may result in the execution of many pseudo code instructions.

The step of transposing a programming language into a lower level code form prior to execution may cause the loss of the essence of the initial expression. Depending upon the effectiveness of the transposing process (i.e. compiler or interpreter), errors may be introduced for particular code constructions. The level and severity of errors introduced in this manner affects the reliability and reusability of the software being interpreted. Additionally, the transposing step consumes processor time and therefore degrades performance of the interpreter system.

It is therefore an objective of the present invention to provide a method and a means for eliminating the intermediate step of transposing a programming language into a lower level code form prior to execution. It is a further objective of the present invention to provide an improved method for creating, interpreting, and executing an interpretive programming language. It is a further objective of the present invention to provide a means and method for improving the performance of an interpreter system. It is a further objective of the present invention to provide a means and method for improving the reliability of the results produced by an interpreter system.

SUMMARY OF THE INVENTION

The present invention provides a means and method for creating, interpreting, and executing a programming language. The present invention is a virtual processor that eliminates interpretation of pseudo code typical of common interpretive engines. By removing this step, the loss of the essence of the initial expression will not occur.

The preferred embodiment of the present invention includes a computer system comprising a bus communicating information, a processor, and a random access memory for storing information and instructions for the processor. The processing logic of the preferred embodiment is operably disposed within the random access memory and executed by the processor of the computer system.

A command stream is a typical input for the processing logic of the present invention. A command stream in this form may be produced by operator entry of an alphanumeric string on alphanumeric input device, included as a command line in a previously generated file and stored on read only memory device, or produced by a parser or preprocessor that outputs a command stream. The syntax of such a command stream consists of a command identifier or function name in combination with a string of arguments or parameters associated with the operation of the identified command.

Upon activation of the processing logic of the present invention, a Reset subroutine is executed to initialize pointers into the command stream and stack and frame pointers. A parser is then executed to manipulate the input command stream and produce an execution stream. The parser includes a call to a function that sets up pointers into the execution stream and produces a subroutine address (i.e. a processing component identifier) corresponding to the specified command. The command is then executed indirectly and a pointer is updated to point to the next command in the execution stream. Arguments for commands are pushed on to and popped from the execution stream using a stack pointer. Results from the execution of commands are pushed onto the stack. For commands that define a new function or procedure, frame data is maintained to preserve the context in which the new function or procedure is executed. Each command in the execution stream is interpreted in this manner until the end of the execution stream is reached.

DETAILED DESCRIPTION OF THE PREFERRED EMBODIMENT

The present invention provides a means and method for creating, interpreting, and executing a programming language. Such programming languages include algorithmic languages, logic and control structures, processing structures and virtual processor means for solving problems. In the following description, numerous specific details are set forth in order to provide a thorough understanding of the invention. However, it will be apparent to one with ordinary skill in the art that these specific details need not be used to practice the present invention. In other instances, well-known logic structures, data structures, and interfaces have not been shown in detail in order not to unnecessarily obscure the present invention.

The present invention provides a general high performance means to interface a programming language to software applications. The present invention is a virtual processor designed to remove interpretation of pseudo code typical of common interpretive engines. By removing this step, the loss of the essence of the initial expression will not occur; thus, a lower level of detailed knowledge is not required by the interpreter. Taking the earlier example of a conditional looping statement:

```
while (j<10) do
  begin
    j:=j+1
  end
```

The above statements are executed by the present invention as a generic 'while' statement offered within a programming language, an arithmetic expression, and an assignment. Given that the arithmetic expression would be equivalent to one instruction, this form is equivalent to three pseudo code instructions. By providing the expression of the original statement, the interpretive engine can execute the task in a more efficient duty cycle.

The advantages of this new method over the traditional is in the area of performance. By driving directly to the actual object code of the executing program rather than generating an intermediate pseudo code form, typical pre-compilation steps are not required. Additionally, by interpreting the actual expression as presented, a more cost effective duty cycle is achieved as measured in time.

The present invention includes a method by which capture and execution of the programming language is performed. Additionally, further advantages are gained in the manner in which the data is stored with relevant data structures and relationships between data items are maintained.

With the advent of high performance hardware computer systems one may realize the value of utilizing programming engines to more generalize software systems. This allows for higher reusability of software during a software systems lifecycle. Additionally, it has been realized via prototype that with the form of interpreting and executing commands in the present invention, one can expect a 2 to 4 times increase in performance over traditional methods of interpretation.

Figure 1:
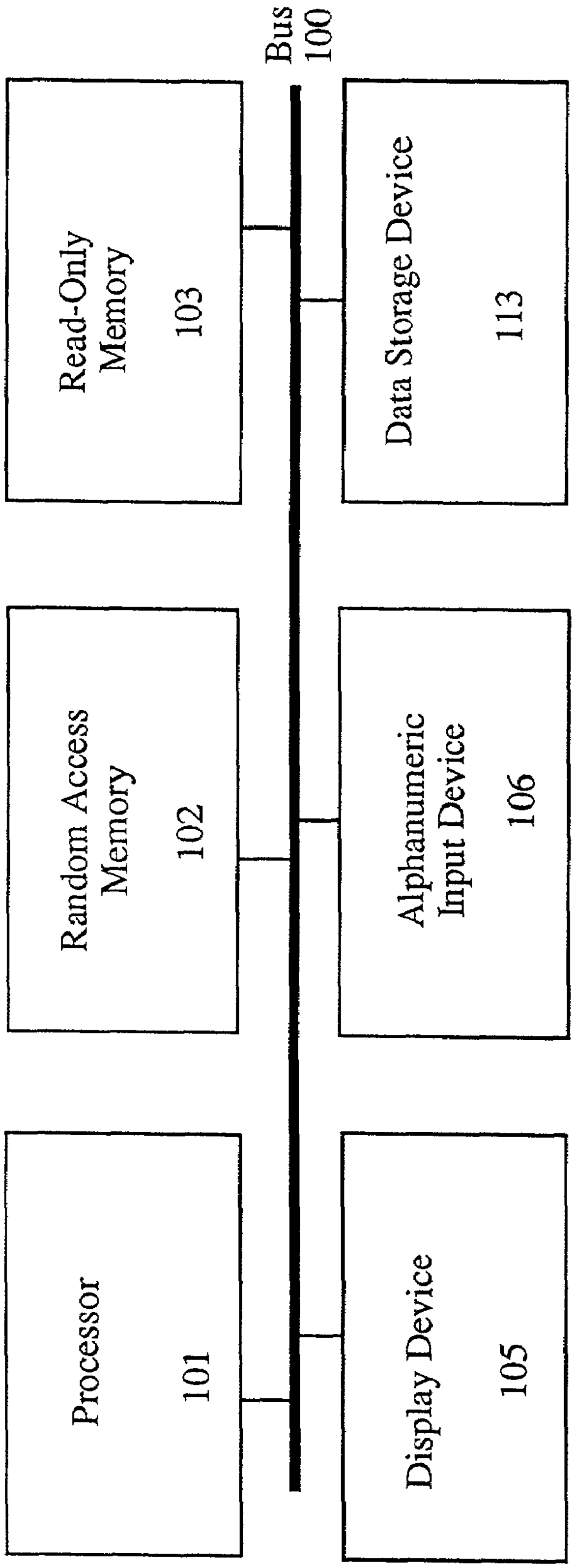
FIG. 1 is an illustration of the typical prior art computer system bus architecture.

The preferred embodiment of the present invention is implemented on a Sun Microsystems, Inc. brand computer system. Other embodiments are implemented on IBM PC brand personal computers and other computer systems. It will be apparent to those with ordinary skill in the art, however, that alternative computer systems may be employed. In general, such computer systems, as illustrated by FIG. 1, comprises a bus 100 for communicating information, a processor 101 coupled with the bus for processing information, and a random access memory 102 coupled with the bus 100 for storing information and instructions for the processor 101. Optionally, such a computer system may include a display device 105 coupled to the bus 100 for displaying information to a computer user, a read only memory 103 coupled with the bus 100 for storing static information and instructions for the processor 101, a data storage device 113 such as a magnetic disk and disk drive coupled with the bus 100 for storing information and instructions, and an alphanumeric input device 106 including alphanumeric and function keys coupled to the bus 100 for communicating information and command selections to the processor 101.

OPERATION OF THE PREFERRED EMBODIMENT

The processing logic of the preferred embodiment is operably disposed within random access memory 102 and, executed by processor 101 of the computer system described above. The processing logic of the present invention may equivalently be disposed in read-only memory 103 or other memory means accessible to processor 101 for execution. A means for loading and activating the processing logic of the present invention exists using techniques well known to those of ordinary skill in the art. Once activated, the processing logic of the present invention operates in the manner described below.

Listing A, provided herein, presents the Baucus Naur description of the supporting data structures and relationships used in the present invention. A detailed specification of the processing logic of the present invention is provided herein in Listing B. Both Listing A and Listing B are provided at the end of this detailed description, but before the claims.

Figure 2A:
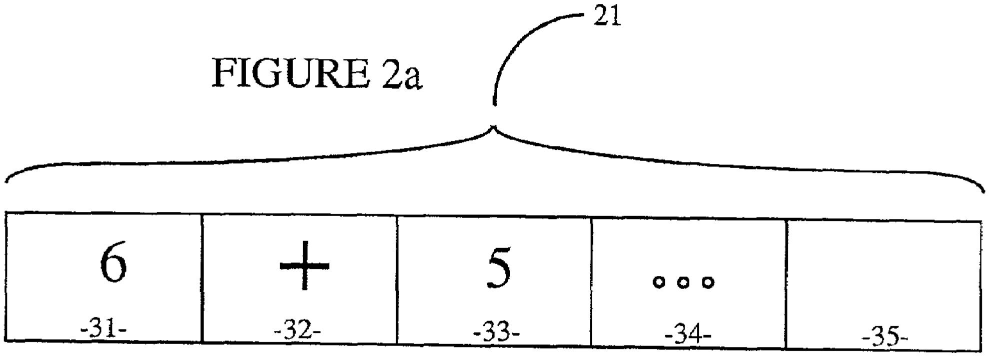
FIG. 2*a* illustrates a typical example of a command stream input to the processing logic of the present invention.

Referring now to the example illustrated in FIG. 2*a*, a typical command stream 21 input to the processing logic of the present invention is illustrated. Such a command stream is typical of the input received by the interpreter of the present invention; however, the techniques of the present invention are not limited to manipulation of input in the particular form illustrated in FIG. 2*a*. Rather, FIG. 2*a* is intended only as a specific example of a typical command stream input.

A command stream 21 in the form of FIG. 2*a* may be produced by operator entry of an alphanumeric string on alphanumeric input device 106, included as a command line in a previously generated file and stored on read only memory device 103, or produced by a parser or preprocessor that outputs a command stream 21 in the form as shown in FIG. 2*a*. The syntax of such a command stream 21 consists of a command identifier or function name in combination with a string of arguments or parameters associated with the operation of the identified command. Such a command stream may be stored in sequential locations of random access memory 102.

Referring still to FIG. 2*a*, an example of an addition function command stream 21 is illustrated. In this addition function example, a command identifier, or plus sign (+) in this case, is stored in a second memory location 32. Arguments for the addition operation are stored in a first memory location 31 and a third memory location 33. The first memory location 31 corresponds to a first argument (in this example, a constant value of 6) for the addition operation.

The third memory location 33 corresponds to a second argument (a constant value of 5) for the addition operation. Other commands and arguments in the command stream may be stored in subsequent memory locations 34 in the command stream 21.

Figure 2B:
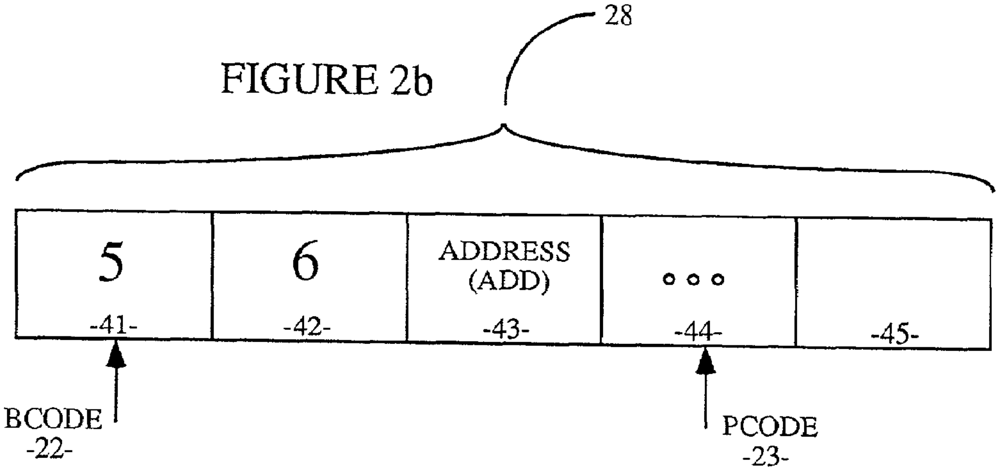
FIG. 2*b* illustrates a typical example of an execution stream input to the processing logic of the present invention.

In a manner described below, the command stream 28 is translated into an execution stream 28 as shown in FIG. 2*b*. Pointers are used to reference locations within execution stream 28. The use of pointers in this way is a technique well known to those or ordinary skill in the art. A base code pointer 22, denoted BCODE, is used by the present invention to identify an initial position of a command within execution stream 28. Another pointer 23, denoted PCODE, is used to identify the first location of a subsequent command in execution stream 28. Pointer 23 thus implicitly identifies the end of a command identified by pointer 22. Initially, PCODE points to the same location as BCODE. The manipulation and control of these and other pointers will become apparent in the detailed description of the processing logic of the present invention presented below.

Figure 3A:
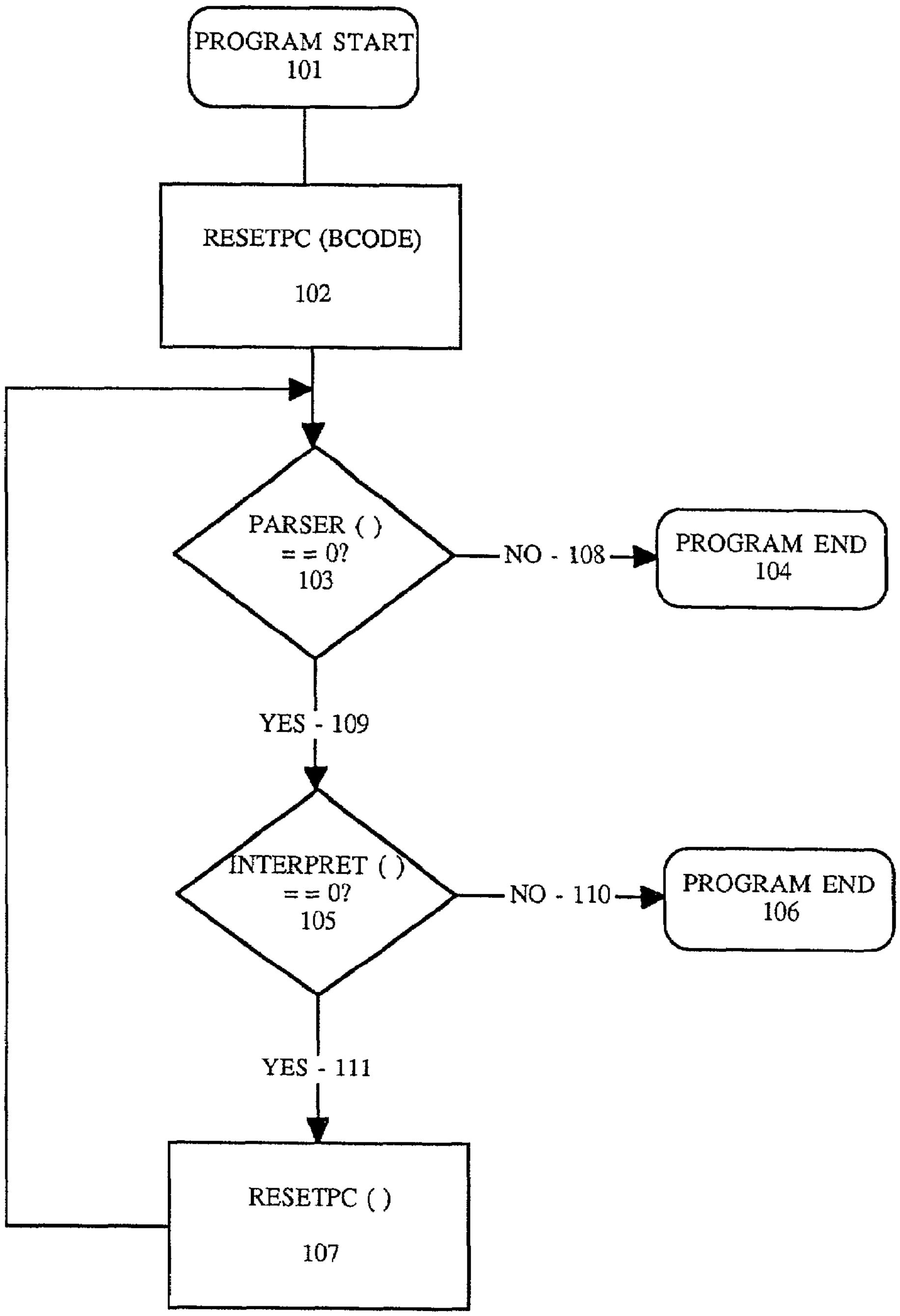
FIGS. 3*a*, 3*b*, 4*a*, 4*b*, 5*a*, 5*b*, 6*a-c*, 7, and 8*a-d* depict the execution flow of the processing logic of the present invention.

The flow charts of FIGS. 3*a*, 3*b*, 4*a*, 4*b*, 5*a*, 5*b*, 6*a-c*, 7, 8*a-d* are used to best illustrate the processing logic of the present invention. Listing A and Listing B provide an additional detailed description of the preferred embodiment of the present invention. Once activated in a manner well known in the art, the processing logic of the preferred embodiment starts at the block labeled Program Start 101 as illustrated in FIG. 3*a*. First, a procedure is called to initialize the pointers used by the present invention. In the preferred embodiment, a call 102 is made to a subroutine denoted RESETPC as illustrated in FIG. 3*b*.

Figure 3B:
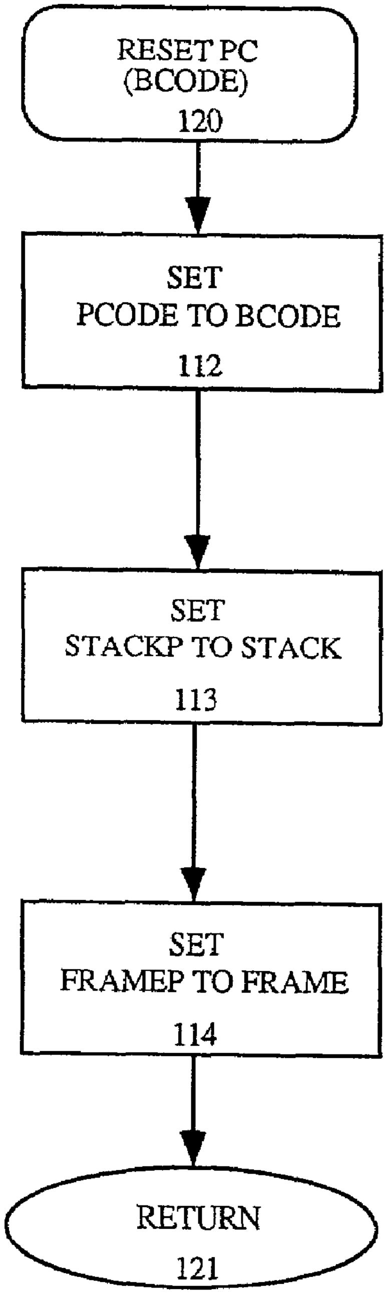

Referring now to FIG. 3*b*, the RESETPC subroutine is illustrated. As indicated, the RESETPC subroutine is called with an input parameter identifying the base code pointer contents (BCODE). As described above and illustrated in FIG. 2*b*, the base code pointer points to the first location of a command within execution stream 28. Referring still to FIG. 3*b*, the base code pointer BCODE is used to initialize another pointer denoted PCODE (processing block 112). The PCODE pointer is used to point to the next command following the command to which BCODE points. In processing block 113, a stack pointer, denoted STACKP, is initialized to the top of a stack located in random access memory. The stack pointer is used by the present invention for pushing and popping arguments for commands in the execution stream 28. In processing block 114, a frame pointer, denoted FRAMEP, is initialized to the top of a frame also stored in random access memory. A frame is a collection of information that fully defines a context in which a newly defined function operates. The frame pointer is used for storing and accessing frame information when a new function is defined or executed in an execution stream. Once these pointers are initialized, processing control returns from the RESETPC subroutine via a return call (processing block 121).

Referring again to the logic illustrated in FIG. 3*a*, processing continues at decision block 103. The present invention includes a parser for converting the raw command input of FIG. 2*a* into a form similar to that illustrated in FIG. 2*b* and described above. As an intermediate step, the parser produces an execution stream by pushing the arguments of the input command into the execution stream in reverse order. The stack pointer is used for the push operation. Functions associated with each argument are also pushed onto the stack in order to identify the data type of the arguments. Thus, for the sample raw input command (6+5), an intermediate execution stream is created in the following form: <constant push><5><constant push><6><add>. This intermediate stream is then processed by the parser into the execution stream shown in FIG. 2*b*.

Figure 4A:
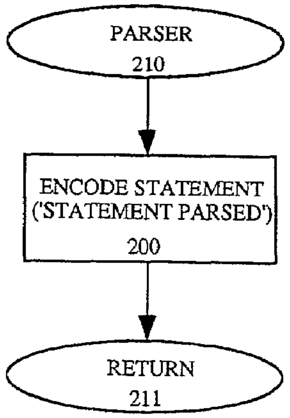
Figure 4B:
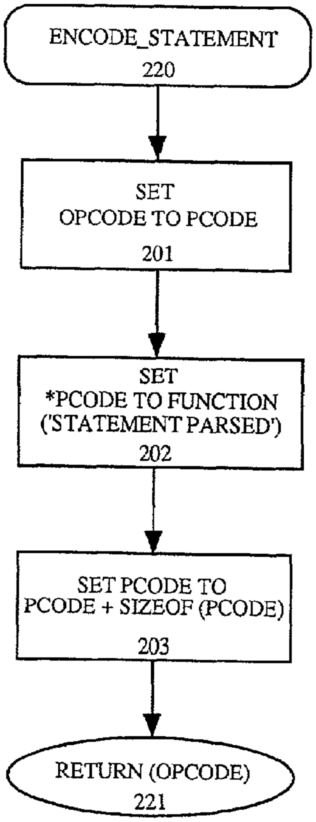

Upon activation of the parser in decision block 103, the processing logic for the parser is executed as illustrated in FIG. 4*a*. Referring to FIG. 4*a*, raw command input is parsed in processing block 200 using a call to an ENCODE_STATEMENT function as illustrated in FIG. 4*b*. Referring now to FIG. 4*b*, the ENCODE_STATEMENT processing logic begins by setting an OPCODE pointer to the pointer value contained in the PCODE pointer (processing block 201). Initially, the PCODE pointer points to the same location as the BCODE pointer as initialized by the RESETPC procedure described above. The PCODE pointer, and thus the OPCODE pointer after the assignment statement of processing block 201, point to the first item in the command stream 21. This item corresponds to the number six (6) which is the first argument in the addition example and located in memory location 31 of the example in FIG. 2*a*. The first argument is used in processing block 202 in a call to the FUNCTION subroutine illustrated in FIG. 7.

Figure 7:
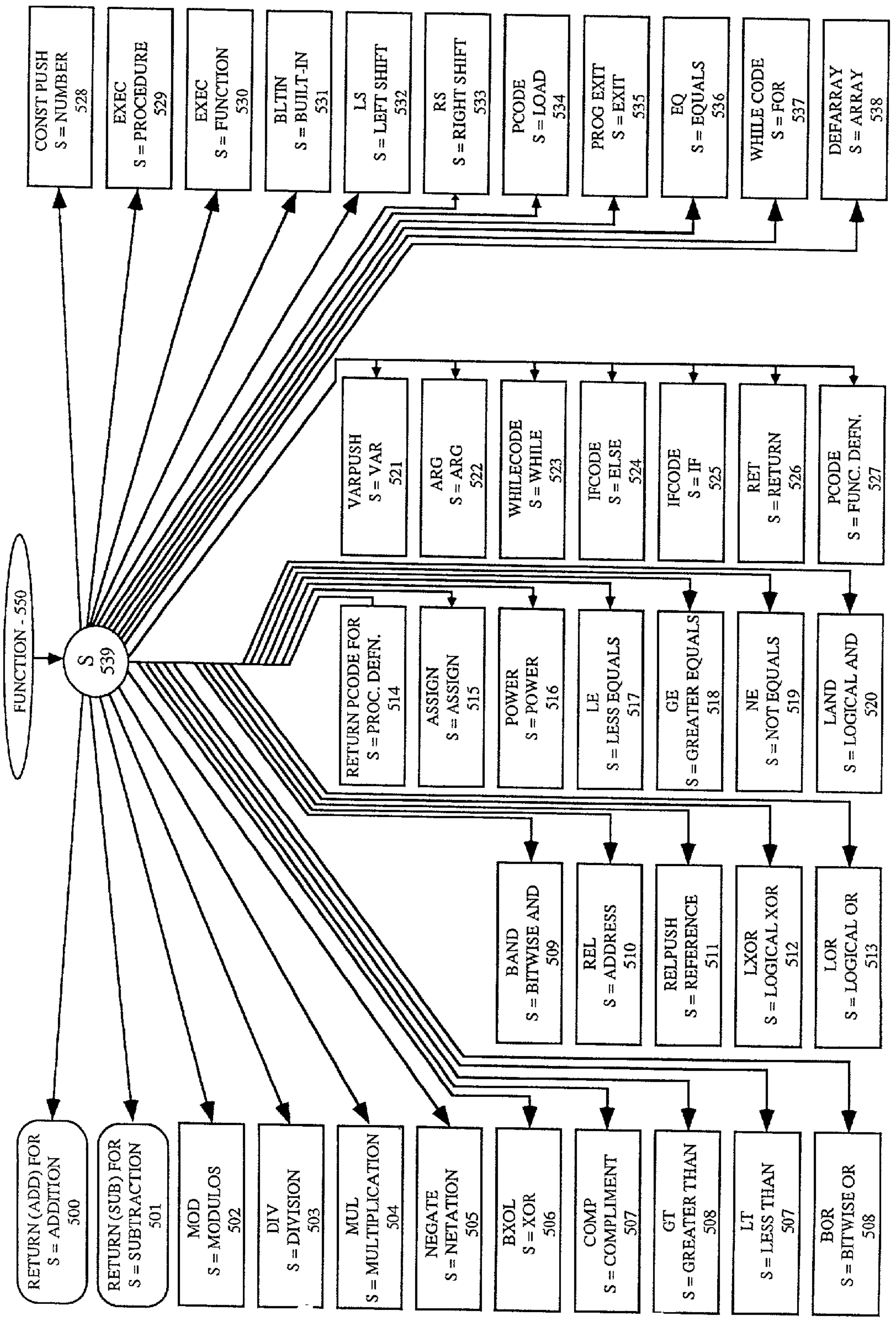

Referring now to FIG. 7, the processing logic for the FUNCTION subroutine is illustrated. The FUNCTION subroutine accepts as input an argument and returns the address of a function or procedure (i.e. a processing component identifier) used to process the associated argument. For example, if the input argument is a number, as is the case with the argument six (6), the FUNCTION subroutine returns the Constant Push (CONST PUSH) function in processing block 528. Similarly, the addresses of other subroutines (i.e. processing component identifiers) are returned for arguments or command identifiers associated with them in each of the other processing blocks in the FUNCTION subroutine illustrated in FIG. 7. For example, if the command identifier present in the execution stream is the plus sign (+) or an addition operator, the FUNCTION subroutine returns the address of an add subroutine as illustrated in processing block 500. The returned functions and arguments are pushed onto the execution stream using the stack pointer.

Referring again to FIG. 4*b*, the processing component identifier associated with the command identifier present in the command steam 21 is returned to the invocation in processing block 202. This processing component identifier is stored into the execution stream 28 at the position to which the PCODE pointer currently points (i.e. location 43). The PCODE pointer is then bumped to the location of the next command identifier in the execution stream, if one is present as shown in FIG. 2*b*. The PCODE pointer is bumped to the next command identifier location by computing the length of the command returned by the FUNCTION subroutine invocation in processing block 202. Since each of the functions returned by the FUNCTION subroutine in processing block 202 has a determinable length, the quantity of memory locations consumed by each command can be predetermined. A function called SIZEOF is used to compute the number of memory locations consumed by each command. Thus, as illustrated in FIG. 5*b*, on invocation of the SIZEOF function 320, the memory storage size is returned in processing block 321.

Referring again to FIG. 4*b*, the size of the current command is added to the contents of the PCODE pointer thus bumping the PCODE pointer to the next command identifier location in the execution stream (processing block 203). The processing for the ENCODE_STATEMENT subroutine then terminates at the return statement 221 where the OPCODE pointer is returned. Processing for parser 210 as illustrated in FIG. 4*a* then terminates at processing block 211. Having completed parser processing, control returns to decision block 103 as illustrated in FIG. 3*a*.

At the completion of parser processing, the execution stream 28 appears as shown in FIG. 2*b* for the addition command example illustrated above. As shown in FIG. 2*b*, the PCODE pointer 23 has been bumped to a position one memory location greater than the end of the ADD command and its associated arguments. Moreover, the address of the ADD function (i.e. the processing component identifier) has been stored at memory location 43.

Referring again to FIG. 3*a*, if the result produced by the parser subroutine invocation at decision block 103 produces a null execution stream, processing path 108 is taken to processing block 104 where the processing logic of the present invention terminates for the null execution stream. If, however, the execution stream 28 produced by the parser is not null or empty, processing path 109 is taken to decision block 105. At decision block 105, an INTERPRET subroutine is invoked to interpret the commands in execution stream 28. The processing logic for the INTERPRET subroutine is illustrated in FIG. 5*a*.

Figure 5A:
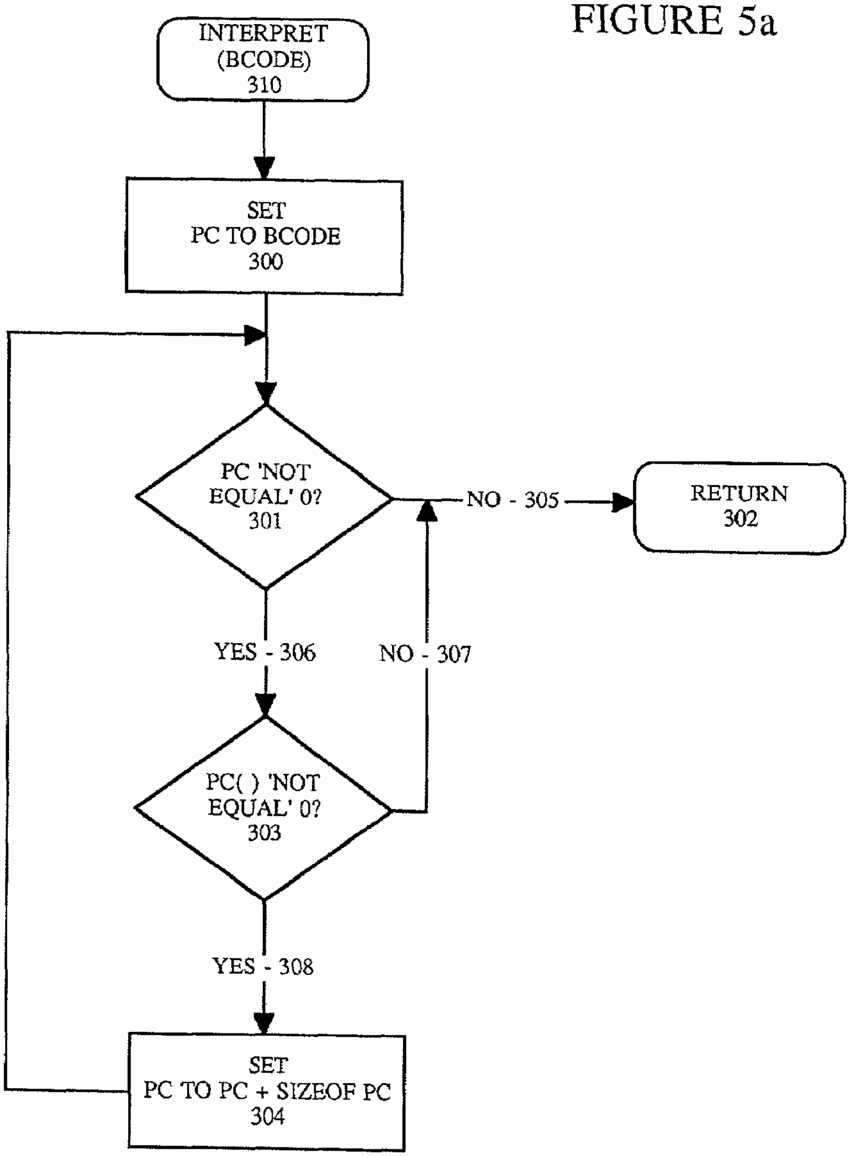
Figure 5B:
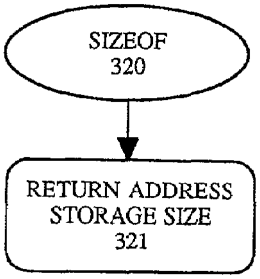

Referring now to FIG. 5*a*, a parsed execution stream is interpreted and the commands therein are executed. First, the BCODE pointer is used to initialize a PC pointer (processing block 300). Beginning at decision block 301, a loop is initiated for executing the commands within execution stream 28. First, a test is made to determine if the PC pointer is pointing to a null or empty item. If so, processing path 305 is taken to processing block 302 where a return statement is executed thereby terminating the interpretation of execution stream 28. If, however, the PC pointer is not pointing to a null item, processing path 306 is taken to decision block 303. At decision block 303, the processing component identifier to which the PC pointer is pointing is accessed and the function or procedure addressed thereby is invoked. Again using the add function command example described above and illustrated in FIGS. 2*a* and 2*b*, the Add function is indirectly invoked at decision block 303. The processing logic thus initiated is illustrated in FIG. 8*c*.

Figure 8A:
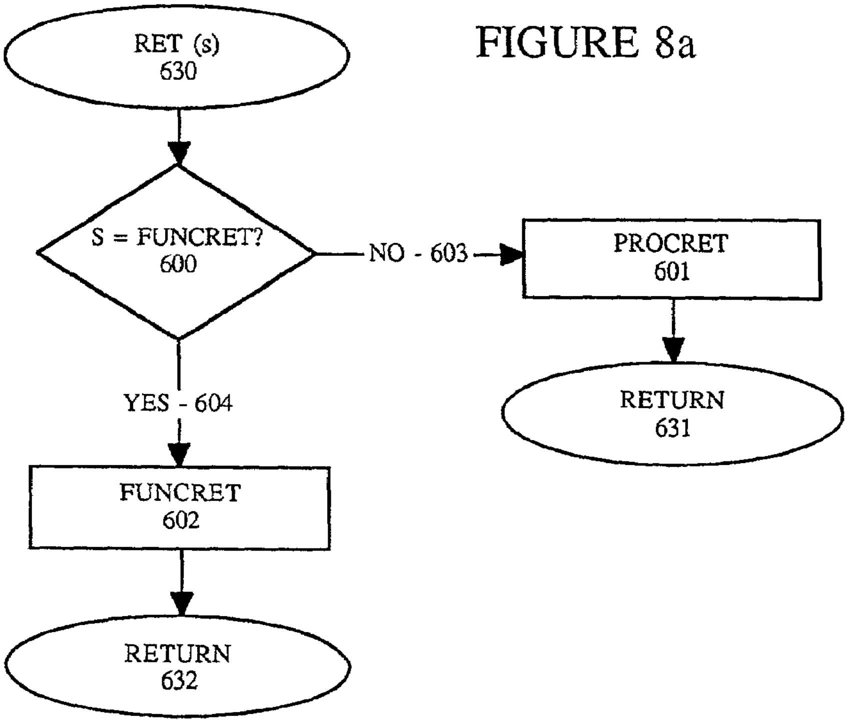
Figure 8B:
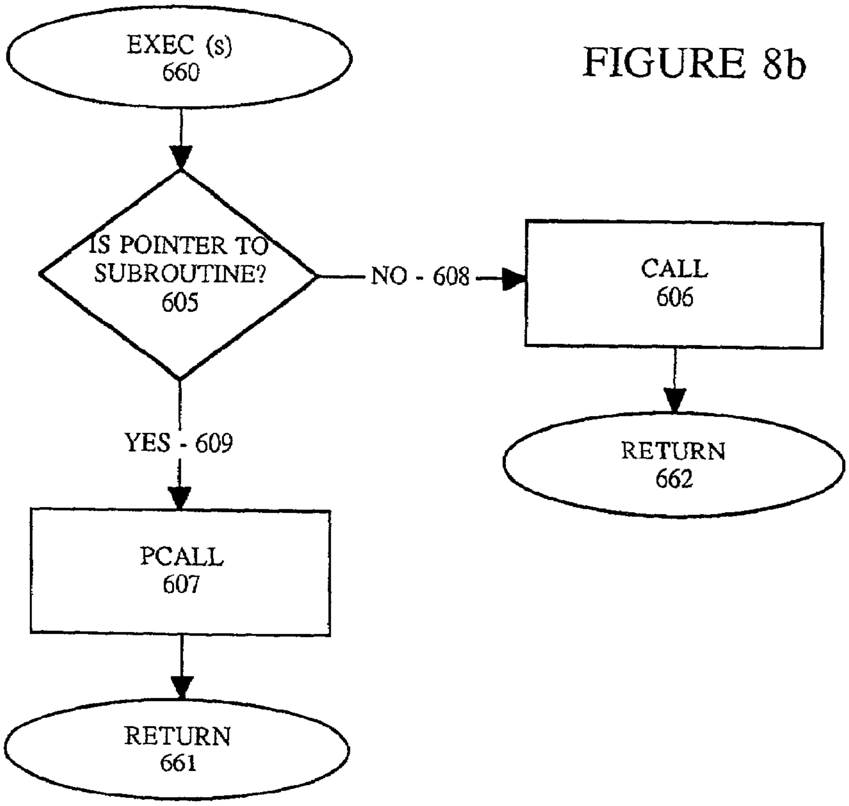
Figure 8C:
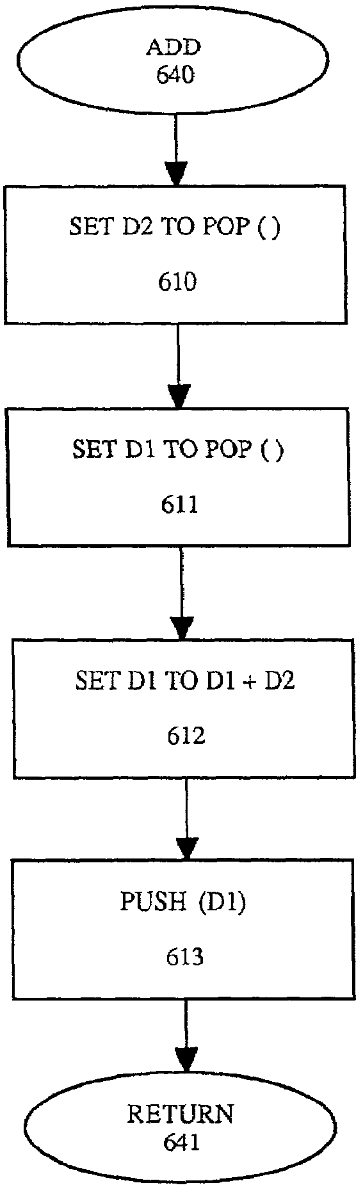

Referring now to FIG. 8*c*, the processing logic for the Add function example is illustrated. Upon invocation, the Add function first retrieves the two operands for the add operation. The two operands are retrieved from the execution stream 28 stack using the POP function and the associated stack pointer. The first operand thus retrieved (processing block 610) is stored in a data item identified as D2, since this operand is the last operand pushed onto the stack. The second operand retrieved (processing block 611) is similarly stored in a data item denoted D1, since this item is actually the first operand pushed onto the stack.

Figure 6A:
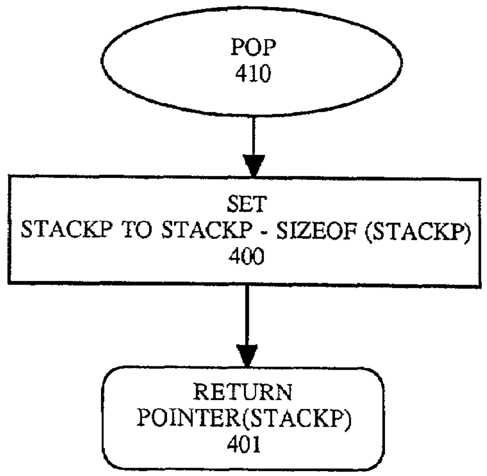

Referring now to FIG. 6*a*, the processing logic for the POP function is illustrated. On invocation of the POP function, the stack pointer is bumped to point to the last item pushed onto the stack (processing block 400). Next, the memory address of the stack pointer is returned in processing block 401 using the logic illustrated in FIG. 6*c*. By returning the memory address of the stack pointer to the subroutine invoking the POP function, the address of the last item pushed onto the stack is provided to the calling function.

Referring again to FIG. 8*c* and the Add operation example, processing block 612 is executed to add the contents of the two operands retrieved from the stack. The resultant sum is stored in a location denoted D1. The PUSH function is thereafter invoked to push the resultant sum onto the execution stream 28 stack (processing block 613). The processing logic for the PUSH function is illustrated in FIG. 6*b*.

Figure 6B:
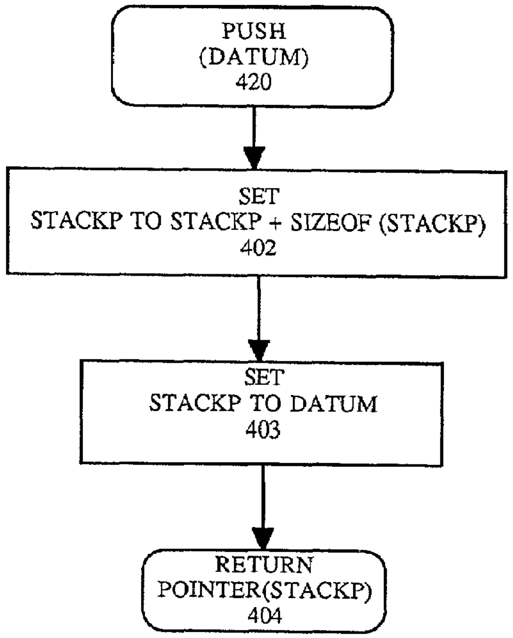
Figure 6C:
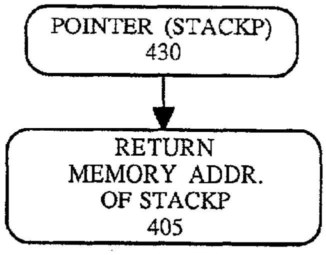

Referring now to FIG. 6*b*, the processing logic for the PUSH function is illustrated. On invocation, the stack pointer is bumped to point to the next available location in the stack (processing block 402). Next, the data item to be pushed onto the stack is stored in the location to which stack pointer is pointing (processing block 403). The PUSH function then returns the memory address of the stack pointer (processing block 404) using the processing logic illustrated in FIG. 6*c*.

Referring again to FIG. 8*c*, processing for the Add function example is completed by the execution of the return statement 641.

Figure 8D:
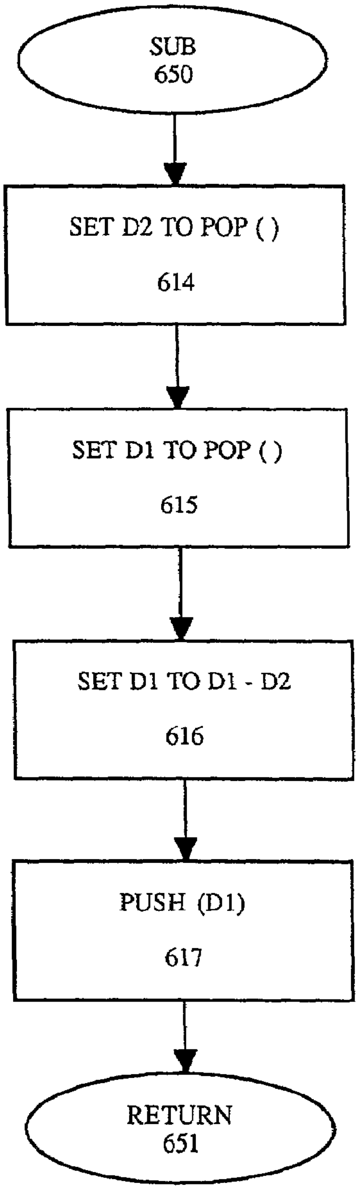

Having completed execution for the Add function, processing control returns to decision block 303 illustrated in FIG. 5*a* where the Add function is originally indirectly invoked. It will be apparent to those skilled in the art that any of the functions illustrated in FIG. 7 or other functions readily available may be invoked using the logic structure illustrated in FIG. 5*a*. In each case, the execution stream 28 stack is used as the source for input parameters for functions as well as the destination for the results produced by the invocation of a function. In a similar manner, for example, a subtract function may be invoked at decision block 303. Processing logic for a subtract function is illustrated in FIG. 8*d*.

One capability supported by the processing logic of the present invention includes defining and executing new procedures and functions. Referring again to FIG. 7, the definition of a new procedure is provided by processing block 514. Similarly, a function definition is provided by processing block 527. In both cases, the address of the new procedure or function is returned as a pointer. Having been defined, new procedures and functions may be executed using processing block 529 and processing block 530 also shown in FIG. 7. In each case, an EXEC function address (i.e. a processing component identifier) is returned and stored in the execution stream 28. The processing logic for the EXEC is illustrated in FIG. 8*b* and described below.

Finally, a return function is provided at processing block 526 as illustrated in FIG. 7. The return function provides a means for returning control from either the execution of a procedure or a function. The processing logic for the return function is illustrated in FIG. 8*a*.

Referring now to FIG. 8*b*, the processing logic for the execute command (EXEC) is illustrated. On invocation of the EXEC command (processing block 660) a single argument is passed as input. This single argument is a pointer to a subroutine or function to which execution control should be passed. If this pointer points to a subroutine, processing path 609 is taken to processing box 606 where the subroutine is activated using a PCALL function. Upon completion of the execution of the subroutine, the return statement 661 is executed thereby terminating the execute command. If, however, the input pointer to the EXEC command is not a subroutine, processing path 608 to processing block 606 where a function is called. Upon completion of the function call, the return statement 662 is executed thereby completing execution of the EXEC command.

Referring now to FIG. 8*a*, the processing logic for the return command (RET) is illustrated. Again, a single input parameter identifies whether the return command is being used in conjunction with a function return or a procedure return. If the input parameter identifies a function return, processing path 604 is taken to processing block 602 where a function return statement is executed. If, however, a procedure return is specified by the input parameter (processing path 603), processing block 601 is executed thereby initiating the return from a procedure. Processing for the return command terminates with the return statement 631 illustrated in FIG. 8*a*.

Thus, an efficient means and method for creating, interpreting, and executing a programming language is disclosed.

Although this invention has been shown in relation to a particular embodiment, it should not be considered so limited. Rather, it is limited only by the appended claims.

Listing A

Baucus Naur Form Description Conventions:

```
::=            definition
'. . . '       literals
<. . . >       nonterminals
[. . . ]       optional
(. . . )       grouping
{. . . }       repeat 0 or more times
. . . | . . .          choice (or)
:m:n           repeat m to n times
ASCII          The ASCII character Set
NIL            The empty set
EOL            The end of line marker
engn             ::=    NIL
                      | { EOL }
                      | { <statement> }
statement        ::=    'exit'
                      | 'do' [ <statement> ]
                      | <comment>
                      | <expr>
                      | <array_def>
                      | <enable>
                      | <disable>
                      | <asgnmnt>
                      | <procedure>
                      | <definition>
                      | <library>
                      | <read>
                      | <write_channel>
                      | <user_message>
                      | <loop_condition>
                      | <if_else_condition>
                      | <create_channel>
                      | <close_channel>
                      | <subroutine_return>
                      | <begin_state> <statement> <end_state>
expr             ::=    <number>
                      | <node>
                      | <comment>
                      | <asgnmnt>
                      | <function>
                      | '(' <expr> ')'
                      | '[' <expr>
                      |       [{','<expr>}]:1:32 ']'
                      | <expr> <binop> <expr>
                      | [ <unop> ] <expr>
alpha            ::=    'A'| . . . |'Z'|'a'| . . . |'z'
digit            ::=    '0'| . . . |'9'
octal            ::=    '0'| . . . |'7'
hex              ::=    'a'|'b'|'c'|'d'|'e'|'f'
                      | 'A'|'B'|'C'|'D'|'E'|'F'
ascii            ::=  ASCII | <ascii>
format           ::=    '%b'|'%d'|'%o'
                      | '%u'|'%x'|'\n'
                      | '\t'|'\r'| <format>
comment          ::=    ';' <ascii> EOL
string           ::=    " " <ascii>:1:512 " "
format_string    ::=    " " { <ascii> | <format> }:1:512 " "
number           ::=    '0x'| <digit> | <hex> }:1:8
                      | '0' { <octal> }:1:12
                      | { <digit> }:1:10
```

-continued

```
identifier         ::=   <digit> | <alpha> | ' '|'.'|'#'
variable           ::=   {<alpha><identifier>}:1:512
argument           ::=   '$' {<digit>}:1:32767
array              ::=   '[' <expr> ']'
pointer            ::=   @~
address            ::=   '&'
reference          ::=   <pointer> | <address>
node               ::=   [<reference>] <variable> [<array>]
                       | [<reference>] <argument> [<array>]
begin_state        ::=   '{'|'begin'
end_state          ::=   '}'|'end'
array def          ::=   'array'{ [<pointer>] <variable> '['<expr> ]'
                              | [<pointer>] <argument> '['<expr>
                              }
subroutine return  ::=   'return' [ <expr> ]
close channel      ::=   'close' <node>
create channel     ::=   'create' <string> ',' <node>
if else condition  ::=   'if' <expr> [ 'then' ] <statement>
                       | ( 'if' <expr> [ 'then' ] <statement>
                           'else' <statement>
                         )
                       | ( 'if' <expr> [ 'then' ] <statement>
                           'else if' <expr> <statement>
                           'else' <statement>
                         )
asgnmnt            ::=   <node> ':=' <expr>
forasgnmnt         ::=   [<reference>] <variable> ':=' <expr>
up_down            ::=   'to' | 'downto'
for_loop           ::=   'for' <forasgnmnt> <up_down> <node>
                           <statement>
while_loop         ::=   'while' <expr> <statement>
loop_condition     ::    <for loop> <statement>
                       | <while loop> <statement>
user_message       ::='   message' <format_string> [(',' <expr>)]:0:255
write_channel      ::=   'write' <node> ',' <format_string>
                                 [ ( ',' <expr> ) ]:0:255
read               ::=   'read' '(' <variable> ')'
library            ::=   'load' <string>
definition         ::=   'proc' <variable> '(' ')' <statement>
                       | 'func' <variable> '(' ')' <statement>
procedure          ::=   <variable> '(' [ ( <expr> ',' ) ]:0:32767 ')'
function           ::=   <variable> '(' [ ( <expr> ',' ) ]:0:32767 ')'
unop               ::=   '!'               /* logical negation */
                       | '-'               /* arithmetic negation */
                         '~' /* binary ones compliment */
binop              ::=   '^'               /* bitwise exclusive or */
                       | '|'               /* bitwise or */
                       | '&'               /* bitwise and */
                       | '**'              /* exponential */
                       | '*'               /* multiplication */
                       | '/'               /* division */
                       | '+'               /* addition */
                       | '-'               /* subtraction */
                       | '%'               /* modulos (remainder) */
                       | '>'               /* relational greater */
                       | '>='              /* relational greater equal */
                       | '<'               /* relational lesser */
                       | '<='              /* relational lesser equal */
                       | '>>'              /* bitwise right shift */
                       | '<<'              /* bitwise left shift */
                       | '&&'              /* logical and */
                       | '||'              /* logical or */
                       | ':='              /* assignment */
                       | ('=' | '==')      /* relational equal */
                       | '!='              /* relational not equal */
```

Baucus Naur Form Description of Data Structures Conventions:

```
::=        definition
'. . . '   literals
<. . .>    nonterminals
[. . .]    optional
(. . .)    grouping
```

-continued

```
{. . .}         repeat 0 or more times
. . . | . . .       choice (or)
:m:n            repeat m to n times
ASCII           The ASCII character Set
NIL             The empty set
EOL             The end of line marker
machine      ::=  <bcode> <stack> <frame>
bcode        ::=  ( <symbol> | <instruction> |
                   <number> | <bcode> | NIL ) | <bcode>
stack        ::=  ( <datum> | NIL ) | <stack>
frame        ::=  ( <symbol> <instruction>
                   <datum> <number> | NIL ) | <frame>
instruction  ::=  0x00000000 . . . 0xFFFFFFFF
datum        ::=  <symbol> | <real>
real         ::=  1.40129846432817e-45 . . . 3.402823466385288e+38
symbol       ::=  <name> <type>
                  <relatives> <array_size>
                  <index> <kin>
                  ( <real> | <instruction> | <string> )
                  <prev symbol>
                  <next symbol>
number       ::=  0x00000000 . . . 0xFFFFFFFF
name         ::=  ('a'|'b' . . . 'z'|'A'|'B' . . . 'Z'|
                  '_'|'-'|'.'|NIL ) <name> | NIL
type         ::=  '+'|'−'|'%'|'/'|'*'|'^'|'>'|
                  '<'|'|'|'&'|'@'|'{'|'}'|
                  128|129|130 . . . 256
relatives    ::=  0x0000 . . . 0xFFFF
array size   ::=  0x0000 . . . 0xFFFF
index        ::=  ( <symbol> | NIL ) | <index>
kin          ::=  ( <symbol> | NIL ) | <index>
prev symbol  ::=  <symbol> | NIL
next symbol  ::=  <symbol> | NIL
```

Listing B

```
resetpc (bcode)
while (parser ( ) 'equals' 0) do
    begin
        if (interpret(bcode) 'not equals' 0) then
            begin
                return
            end
        resetpc (bcode)
    end
subroutine parser
    begin
        encode_statement ('statement parsed')
    end
subroutine encode_statement ('statement parsed')
    begin
        opcode := pcode
        pcode := function ('statement parsed')
        pcode :=pcode 'addition' sizeof (pcode)
        return opcode
    end
subroutine function
    begin
        switch on statement
            case addition               return (add)
            case subtraction            return (sub)
            case modulos                return (mod)
            case division               return (div)
            case multiple               return (mul)
            case negation               return (negate)
            case bitwise exclusive or   return (bxor)
            case compliment             return (comp)
            case greater then           return (gt)
            case less than              return (lt)
            case bitwise or             return (bor)
            case bitwise and            return (band)
            case address                return (rel)
            case reference              return (relpush)
```

-continued

```
            case logical exclusive or   return (lxor)
            case logical or             return (lor)
            case logical and            return (land)
            case not equals             return (ne)
            case greater equals         return (ge)
            case less equals            return (le)
            case power                  return (power)
            case assign                 return (assign)
            case procedure definition   return (pcode)
            case function definition    return (pcode)
            case return                 return (funcret | procret)
            case if                     return (ifcode)
            case else                   return (ifcode)
            case while                  return (whilecode)
            case arg                    return (arg)
            case var                    return (varpush
            case number                 return (constpush)
            case producture execute     return (call | pcall)
            case function execute       return (call | pcall)
            case built-in function      return (bltin)
            case left shift             return (ls)
            case right shift            return (rs)
            case load library           return (pcode)
            case exit                   return (progexit)
            case equals                 return (eq)
            case for                    return (whilecode)
            case array                  return (defarray)
subroutine resetpc
    begin
        pcode := bcode
        stackp := stack
        framep := frame
    end
subroutine interpret
    begin
        pc := bcode
        while (pc not 'equals' 0) do
            begin
                if ( (*(*pc) ( ) ) 'not equal' 0) then
                    begin
                        return
                    end
                pc := pc 'addition' sizeof (pc)
            end
    end
subroutine sizeof
    begin
        return address storage size
    end
subroutine add
    begin
        d2 := pop ( )
        d1 := pop ( )
        d1 := d1 'addition' d2
        push (d1)
    end
subroutine sub
    begin
        d2 := pop ( )
        d1 := pop ( )
        d1 := d1 'subtraction' d2
        push (d1)
    end
subroutine mod
    begin
        d2 := pop ( )
        d1 := pop ( )
        d1 := remainder of (d1 'division' d2)
        push (d1)
    end
subroutine mul
    begin
        d2 := pop ( )
        d1 := pop ( )
        d1 := d1 'multiplication' d2
        push (d1)
    end
subroutine div
    begin
```

-continued

```
            d2 := pop ( )
            d1 := pop ( )
            d1 := d1 'division' d2
            push (d1)
        end
subroutine negate
        begin
            d1 := pop ( )
            d1 := 'negation' d1
            push (d1)
        end
subroutine bxor
        begin
            d2 := pop ( )
            d1 := pop ( )
            d1 := d1 'bitwise exclusive or' d2
            push (d1)
        end
subroutine comp
        begin
            d1 := pop ( )
            d1 := 'ones compliment' d1
            push (d1)
        end
subroutine gt
        begin
            d2 := pop ( )
            d1 := pop ( )
            d1 := d1 'greater than' d2
            push (d1)
        end
subroutine lt
        begin
            d2 := pop ( )
            d1 := pop ( )
            d1 := d1 'less than' d2
            push (d1)
        end
subroutine bor
        begin
            d2 := pop ( )
            d1 := pop ( )
            d1 := d1 'bitwise or' d2
            push (d1)
        end
subroutine band
        begin
            d2 := pop ( )
            d1 := pop ( )
            d1 := d1 'bitwise and' d2
            push (d1)
        end
subroutine rel
        begin
            d := pc
            pc := pc + sizeof (pc)
            if (d isrelated) then
                begin
                    push (d)
                end
            else
                begin
                    return
                end
        end
subroutine relpush
        begin
            d := pc
            pc := pc + sizeof (pc)
            if (d isrelated) then
                begin
                    value := 0
                    while (i < relative count of d) do
                        begin
                            value := value 'bitwise or'
                                relative value 'left shift' i
                        end
                    d := value
                    push (d)
```

-continued

```
                end
            else
                begin
                    return
                end
        end
subroutine lxor
        begin
            d2 := pop ( )
            d1 := pop ( )
            if (d1 'equals' unknown 'or' d2 'equals' unknown) then
                begin
                    d1 := unknown
                end
            else then
                begin
                    d1 := d1 'bitwise exclusive or ' d2
                end
            push (d1)
        end
subroutine lor
        begin
            d2 := pop ( )
            d1 := pop ( )
            if (d1 'equals' unknown) then
                begin
                    if (d2 'equals' unknown) then
                        begin
                            push (d1)
                        end
                    else if (d2 'equals' 1) then
                        begin
                            push (d2)
                        end
                    else then
                        begin
                            push (d1)
                        end
                end
            else if (d1 'equals' 1) then
                begin
                    push (d2)
                end
            else then
                begin
                    if (d2 'equals' unknown) then
                        begin
                            push (d2)
                        end
                    else if (d2 'equals' 1) then
                        begin
                            push (d2)
                        end
                    else then
                        begin
                            push (d1)
                        end
                end
        end
subroutine land
        begin
            d2 := pop ( )
            d1 := pop ( )
            if (d1 'equals' unknown ) then
                begin
                    if (d2 'equals' unknown) then
                        begin
                            push (d1)
                        end
                    else if (d2 'equals' 1) then
                        begin
                            push (d1)
                        end
                    else then
                        begin
                            push (d2)
                        end
                end
            else if (d1 'equals' 1) then
```

-continued

```
        begin
            if (d2 ‘equals’ unknown) then
                begin
                    push (d2)
                end
            else if (d2 ‘equals’ 1) then
                begin
                    push (d1)
                end
            else then
                begin
                    push (d2)
                end
        end
    else then
        begin
            push (d1)
        end
end
subroutine ne
    begin
        d2 := pop ( )
        d1 := pop ( )
        d1 := d1 ‘not equals’ d2
        push (d1)
    end
subroutine ge
    begin
        d2 := pop ( )
        d1 := pop ( )
        d1 := d1 ‘greater equals’ d2
        push (d1)
    end
subroutine le
    begin
        d2 := pop ( )
        d1 := pop ( )
        d1 := d1 ‘less equals’ d2
        push (d1)
    end
subroutine power
    begin
        d2 := pop ( )
        d1 := pop ( )
        if (d2 ‘equals’ 0) then
            begin
                d1 := 1
            end
        else then
            begin
                for j := 0 and n := 1 to d2 do
                    begin
                        n := n ‘multiply’ d1
                        j := j ‘addition’ 1
                    end
                d1 := n
            end
                push (d1)
    end
subroutine assign
    begin
        d2 := pop ( )
        d1 := pop ( )
        d1 := d1 ‘assignment’ d2
        push (d1)
    end
subroutine funcret
    begin
        d := pop ( )
        ret ( )
        push (d)
    end
subroutine procret
    begin
        ret ( )
    end
subroutine ret
    begin
        for i := 0 to framep argument count do
```

-continued

```
                begin
                    d := pop ( )
                end
            pc := framep returning pc address
            framep := framep ‘subtraction’ sizeof (framep)
        end
subroutine ifcode
    begin
        savepc := pc
        interpret (savepc ‘addition’ 3)
        d := pop ( )
        if (d) then
            begin
                interpret (savepc)
            end
        else then
            begin
                interpret (savepc ‘addition’ 1)
            end
        pc := savepc ‘addition’ 2
    end
subroutine whilecode
    begin
        savepc := pc
        interpret (savepc ‘addition’ 2)
        d := pop ( )
        while (d) then
            begin
                interpret (savepc)
                interpret (savepc ‘addition’ 2)
                d := pop ( )
            end
        pc := savepc ‘addition’ 1
    end
subroutine arg
    begin
        argument_number := pc
        pc := pc ‘addition’ sizeof (pc)
        d := framep argument of argument_number
        pushd (d)
    end
subroutine varpush
    begin
        d := pc
        pc := pc ‘addition’ sizeof (pc)
        pushd (d)
    end
subroutine constpush
    begin
        d := pc
        pc := pc ‘addition’ sizeof (pc)
        pushd (d)
    end
subroutine call
    begin
        sp := pc
        framep := framep ‘addition’ sizeof (framep)
        framep symbol of ‘equals’ sp
        framep number of arguments ‘equals’ pc ‘addition’ 1
        framep return address ‘equals’ pc ‘addition’ 2
        framep arguments ‘equals’ stackp ‘subtraction’ 1
        interpret (sp)
    end
subroutine pcall
    begin
        nargs := pc
        if (nargs ‘equals’ 0) then begin offset := 1 end
        else then begin offset := nargs ‘addition’ 1 end
        d := (stackp ‘subtraction’ offset)
        framep := framep ‘addition’ sizeof (framep)
        framep symbol of ‘equals’ d
        framep number of arguments ‘equals’ pc ‘addition’ 1
        framep return address ‘equals’ pc ‘addition’ 2
        framep arguments ‘equals’ stackp ‘subtraction’ 1
        interpret (d)
    end
subroutine bltin
    begin
        d := pop ( )
```

-continued

```
        d := (*pc (d))
        push (d)
    end
subroutine ls
    begin
        d1 := pop ( )
        d2 := pop ( )
        d1 := d1 'bitwise left shift' d2
        push (d1)
    end
subroutine rs
    begin
        d1 := pop ( )
        d2 := pop ( )
        d1 := d1 'bitwise right shift' d2
        push (d1)
    end
subroutine progexit
    begin
        return 1
    end
subroutine eq
    begin
        d1 := pop ( )
        d2 := pop ( )
        d1 := d1 'equals' d2
        push (d1)
    end
subroutine defarray
    begin
        d1 := pc
        pc := pc 'addition' sizeof (pc)
        d2 := pop ( )
        d1 := 'define array' 'valueof' d2
    end
subroutine pop
    begin
        stackp := stackp 'subtraction' sizeof (stackp)
        return (pointer (stackp ))
    end
subroutine push
    begin
        stackp := stackp 'addition' sizeof (stackp)
        pointer (stackp) := d
    end
subroutine pointer
    begin
        return (machine memory address of stackp)
    end
```

What is claimed is:

1. An apparatus, comprising:

a machine-readable storage medium; and instructions in the machine-readable storage medium, wherein the instructions, when executed by a data processing system, implement an interpreter to perform operations comprising:

receiving a series of source code instructions expressed in a programming language, wherein at least one of the source code instructions comprises a command and an argument;

in response to receiving a source code instruction having a command and an argument, building at least part of a stack-based execution stream; and after building at least part of the stack-based execution stream, executing the stack-based execution stream;

wherein the operation of building at least part of a stack-based execution stream comprises:

storing the instruction's argument on a stack;

determining an address for an object code routine corresponding to the instruction's command; and storing the address for said object code routine on the stack.

2. An apparatus according to claim 1, wherein the operation of executing the stack-based execution stream comprises using the address of the object code routine from the stack to call said object code routine.

3. An apparatus according to claim 1, wherein:

the operation of receiving a series of source code instructions expressed in a programming language comprises repeatedly calling a parser routine from a primary routine for interpretively executing source code instructions; and the operation of building at least part of a stack-based execution stream comprises:

pushing the instruction's argument onto the stack from the parser routine; and pushing the address for the object code routine corresponding to the instruction's command onto the stack from the parser routine.

4. An apparatus according to claim 1, wherein:

the operation of receiving a series of source code instructions expressed in a programming language comprises repeatedly calling a parser routine from a primary routine for interpretively executing source code instructions;

the operation of building at least part of a stack-based execution stream comprises:

(a) pushing the instruction's argument onto the stack from the parser routine; and (b) pushing the address for the object code routine corresponding to the instruction's command onto the stack from the parser routine; and the operation of executing the stack-based execution stream comprises:

(a) calling an interpreter routine from the primary routine, wherein the interpreter routine uses the address of the object code routine from the stack to call said object code routine;

(b) retrieving the argument from the stack, wherein said retrieval is performed by the object code routine;

(c) using the argument when executing the object code routine; and (d) storing a result of the object code routine on the stack.

5. An apparatus according to claim 1, wherein the operation of executing the stack-based execution stream comprises:

retrieving the argument from the stack; and using the argument when executing the object code routine.

6. An apparatus according to claim 1, wherein the operation of executing the stack-based execution stream comprises:

retrieving the argument from the stack;

using the argument when executing the object code routine; and storing a result of the object code routine on the stack.

7. An apparatus according of claim 1, wherein the operation of executing the stack-based execution stream comprises:

recursively executing the object code routine.

8. A method for executing source code instructions expressed in a programming language, the method comprising:

receiving a series of source code instructions expressed in a programming language, wherein at least one of the source code instructions comprises a command and an argument;

in response to receiving a source code instruction having a command and an argument, building at least part of a stack-based execution stream; and after building at least part of the stack-based execution stream, executing the stack-based execution stream;

wherein the operation of building at least part of a stack-based execution stream comprises:

storing the instruction's argument on a stack;

determining an address for an object code routine corresponding to the instruction's command; and storing the address for said object code routine on the stack.

9. A method according to claim 8, wherein the operation of executing the stack-based execution stream comprises using the address of the object code routine from the stack to call said object code routine.

10. A method according to claim 8, wherein:

the operation of receiving a series of source code instructions expressed in a programming language comprises repeatedly calling a parser routine from a primary routine for interpretively executing source code instructions; and the operation of building at least part of a stack-based execution stream comprises:

pushing the instruction's argument onto the stack from the parser routine; and pushing the address for the object code routine corresponding to the instruction's command onto the stack from the parser routine.

11. A method according to claim 8, wherein:

the operation of receiving a series of source code instructions expressed in a programming language comprises repeatedly calling a parser routine from a primary routine for interpretively executing source code instructions;

the operation of building at least part of a stack-based execution stream comprises:

(a) pushing the instruction's argument onto the stack from the parser routine; and (b) pushing the address for the object code routine corresponding to the instruction's command onto the stack from the parser routine; and the operation of executing the stack-based execution stream comprises:

(a) calling an interpreter routine from the primary routine, wherein the interpreter routine uses the address of the object code routine from the stack to call said object code routine;

(b) retrieving the argument from the stack, wherein said retrieval is performed by the object code routine;

(c) using the argument when executing the object code routine; and (d) storing a result of the object code routine on the stack.

12. A method according to claim 8, wherein the operation of executing the stack-based execution stream comprises:

retrieving the argument from the stack; and using the argument when executing the object code routine.

13. A method according to claim 8, wherein the operation of executing the stack-based execution stream comprises:

retrieving the argument from the stack;

using the argument when executing the object code routine; and storing a result of the object code routine on the stack.

14. A method according to claim 8, wherein the operation of executing the stack-based execution stream comprises:

recursively executing the object code routine.

15. A data processing system, comprising:

a processor;

a machine-readable storage medium responsive to the processor; and instructions in the machine-readable storage medium, wherein the instructions, when executed by the processor, implement an interpreter to perform operations comprising:

receiving a series of source code instructions expressed in a programming language, wherein at least one of the source code instructions comprises a command and an argument;

in response to receiving a source code instruction having a command and an argument, building at least part of a stack-based execution stream; and after building at least part of the stack-based execution stream, executing the stack-based execution stream;

wherein the operation of building at least part of a stack-based execution stream comprises:

storing the instruction's argument on a stack;

determining an address for an object code routine corresponding to the instruction's command; and storing the address for said object code routine on the stack.

16. A data processing system according to claim 15, wherein the operation of executing the stack-based execution stream comprises using the address of the object code routine from the stack to call said object code routine.

17. A data processing system according to claim 15, wherein:

the operation of receiving a series of source code instructions expressed in a programming language comprises repeatedly calling a parser routine from a primary routine for interpretively executing source code instructions; and the operation of building at least part of a stack-based execution stream comprises:

pushing the instruction's argument onto the stack from the parser routine; and pushing the address for the object code routine corresponding to the instruction's command onto the stack from the parser routine.

18. A data processing system according to claim 15, wherein:

the operation of receiving a series of source code instructions expressed in a programming language comprises repeatedly calling a parser routine from a primary routine for interpretively executing source code instructions;

the operation of building at least part of a stack-based execution stream comprises:

(a) pushing the instruction's argument onto the stack from the parser routine; and (b) pushing the address for the object code routine corresponding to the instruction's command onto the stack from the parser routine; and the operation of executing the stack-based execution stream comprises:

(a) calling an interpreter routine from the primary routine, wherein the interpreter routine uses the address of the object code routine from the stack to call said object code routine;

(b) retrieving the argument from the stack, wherein said retrieval is performed by the object code routine;

(c) using the argument when executing the object code routine; and (d) storing a result of the object code routine on the stack.

19. A data processing system according to claim 15, wherein the machine-readable medium comprises at least one medium from the group consisting of:

random access memory;

non-volatile memory; and disk based storage.

* * * * *